United States Patent [19]

Ainsworth, Jr. et al.

[11] Patent Number: 5,401,934
[45] Date of Patent: Mar. 28, 1995

[54] LENS SYSTEM FOR SCANNING LASER APPARATUS

[75] Inventors: Thomas Ainsworth, Jr., Ossining; George Chiu, Cross River, both of N.Y.; Rama N. Singh, Bethel, Conn.; Janusz S. Wilczynski, Ossining, N.Y.

[73] Assignee: International Business Machines Corporation, Armonk, N.Y.

[21] Appl. No.: 28,022

[22] Filed: Mar. 8, 1993

[51] Int. Cl.6 ........................................... B23K 26/08
[52] U.S. Cl. ........................ 219/121.18; 219/121.74; 219/121.75
[58] Field of Search ............... 219/121.68, 121.69, 219/121.74, 121.75, 121.8

[56] References Cited

U.S. PATENT DOCUMENTS

| | | | |
|---|---|---|---|
| 3,951,546 | 4/1976 | Markle | 355/51 |
| 4,315,130 | 2/1982 | Inagaki et al. | 219/121 |
| 4,661,679 | 4/1987 | Pardee | 219/121 |
| 4,822,975 | 4/1989 | Torigoe | 219/121.85 |
| 5,109,149 | 4/1992 | Leung | 219/121.69 |
| 5,159,172 | 10/1992 | Goodman et al. | 219/121.68 |

OTHER PUBLICATIONS

Unit Magnification Optical System without Seidel Abberrations, J. Dyson, Journal of the Optical Society of America, vol. 49, Nov. 7, Jul. 59, pp. 713–716.

*Primary Examiner*—C. L. Albritton
*Attorney, Agent, or Firm*—Perman & Green

[57] ABSTRACT

A lens system for a laser scanning apparatus which incorporates two transfer lenses in tandem. The transfer lenses include angular reflecting mirrors, correction lenses, and concave mirrors. The transfer lenses are located between the projection mask and the target of the scanning apparatus wherein the laser beam passed through the projection mask is reflected by an angularly disposed mirror through the first correction lens onto the first concave mirror where it is reflected back through the first correction lens and onto another angularly disposed mirror where the beam is sent to and back from the second concave mirror through the second correction lens and then onto the target.

5 Claims, 4 Drawing Sheets

LENS SYSTEM FOR SCANNING LASER APPARATUS

BACKGROUND OF THE INVENTION

1. Field of the Invention

The present invention relates to structures for treating an object by a laser beam, and more particularly to an optical system for a laser beam structure which includes a parity corrected lens.

2. Background Art

Structures including a laser beam and optical elements have been used to irradiate an object for treatment such as quenching, alloying, ablating and the like. In U.S. Pat. No. 4,315,130 issued Feb. 9, 1992 to Inagaki et al. entitled "Method of Treating Object By Laser Beam and Apparatus Therefor", a laser treatment apparatus is disclosed in which the laser beam emitted from a laser for irradiating an object is divided into a plurality of fractional beams and the fractional beams are reflected towards the object to be irradiated with uniform energy distribution. A plurality of different configurations of reflecting means are shown.

In U.S. Pat. No. 4,822,975 issued Apr. 18, 1989 to Torigoe entitled "Method and Apparatus for Scanning Exposure", an apparatus is disclosed for scanning exposure with a pulsed laser beam. A pattern of a first member is irradiated by the pulsed laser beam and the pattern of the first member is projected onto a second member. During the pattern projection the first and second members are moved in a predeterminedly synchronized relation, while the irradiation or pulse emission and the movement of the first and second members are co-ordinated with each other, whereby a uniform amount of exposure is ensured on the second member.

In U.S. Pat. No. 4,661,679 issued Apr. 28, 1987 to Pardee entitled "Semiconductor Laser Processing With Mirror Mask", a semiconductor processing technique is provided for reacting with the surface of a semiconductor wafer substrate only along a predetermined pattern without a pass-through mask. Excimer pulsed ultraviolet laser radiation is reflected by a mirror having a selective pattern thereon to direct laser radiation only along a predetermined pattern onto the substrate surface as determined by the selective mirror pattern to selectively activate designated areas of the substrate.

U.S. Pat. No. 5,109,149 issued Apr. 28, 1992 to Leung entitled "Laser Direct-Write Integrated Circuit Production System" discloses a laser, direct-write system for making personalized custom or semi-custom integrated circuits with a very fast turnaround time. The system includes a method and apparatus for high precision scanning of a submicron laser spot. The laser beam is scanned at the entrance of a beam expander. The beam expander reduces the scan angle and error produced by a mechanical scanning device such as a rotating polygonal mirror. The smaller scan angle at the output of the beam expander matches well with the projection optics of a laser, direct-write integrated circuit production system.

U.S. Pat. No. 3,951,546 issued Apr. 20, 1976 to Markle entitled "Three-Fold Mirror Assembly For A Scanning Projection System" describes a three-fold mirror array for a scanning projection system to permit placing the object and image of an annular reflective projection system in an orientation which facilitates scanning and yields an image symmetry identical to that obtained with contact printing in which three folding flats are combined with an annular field projection system. The three folding flats are incorporated in a monolithic assembly having a 90° groove on one side and a fold surface perpendicular to the other folding surfaces on the other side of the assembly thereby permitting a simple pivoting scanning mechanism to be used for scanning a field larger than the narrow annular field available in the projection system.

SUMMARY OF THE INVENTION

An object of the present invention is to provide a structure for ablating an object by a laser beam that incorporates a parity corrected lens.

Another object of the present invention is to provide an improved transfer lens system for a laser beam ablation apparatus wherein two transfer lenses are used in tandem.

A further object of the present invention is to provide a transfer lens system for a scanning laser beam ablation apparatus including a parity corrected double Dyson lens in combination with plano mirrors for providing a full field size.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Ablation of an object by a laser beam such as from an excimer laser is an important manufacturing technique. One type of ablation is performed on an object by directing the laser beam through a projection imaging system, with a pattern on a stationary mask which is projected and transferred onto the stationary object. For patterns too large for the lens, or for patterns so large that more energy is required than is available, a stepping technique is employed in which the object is relocated between ablation operations. In the present invention a scanning apparatus is used in which a patterned mask and the object are stationary relative to each other on a stage. A lens is located between them for imaging some portion of the mask onto the object.

Figure 1:
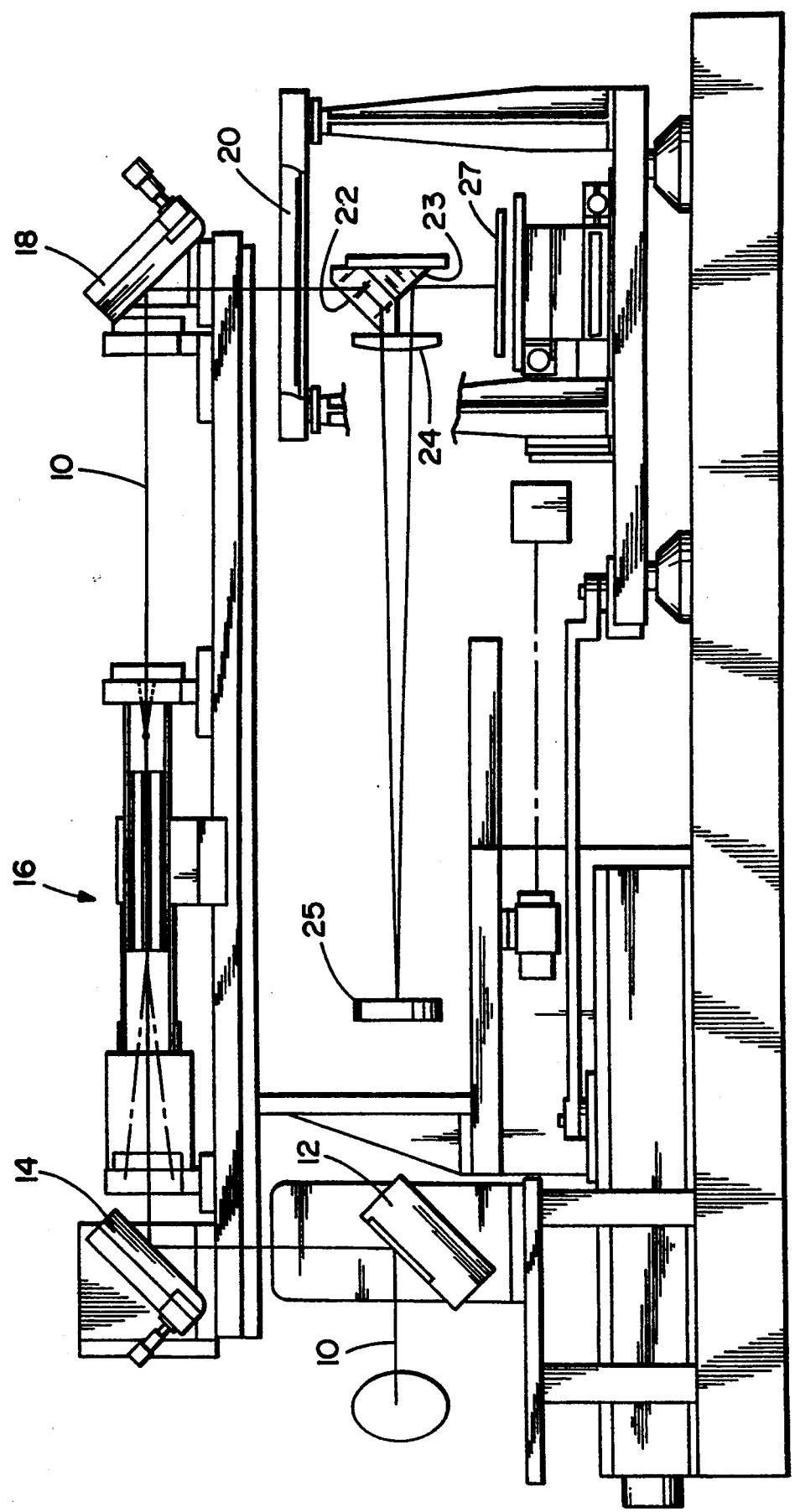
FIG. 1 is a schematic illustration of a side-view of a prior art apparatus for scanning a laser beam onto an object for ablation.
Figure 2:
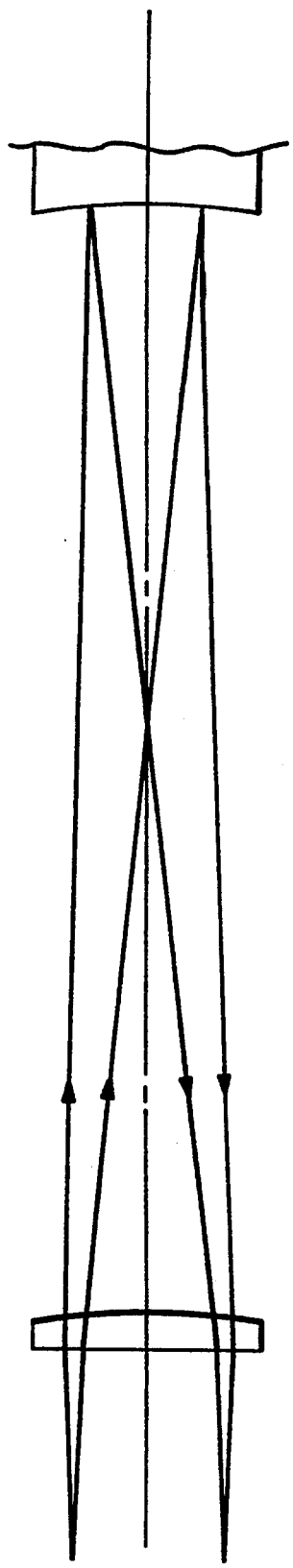
FIG. 2 is a schematic illustration showing the lens elements and optical paths for the prior art apparatus of FIG. 1.
Figure 3:
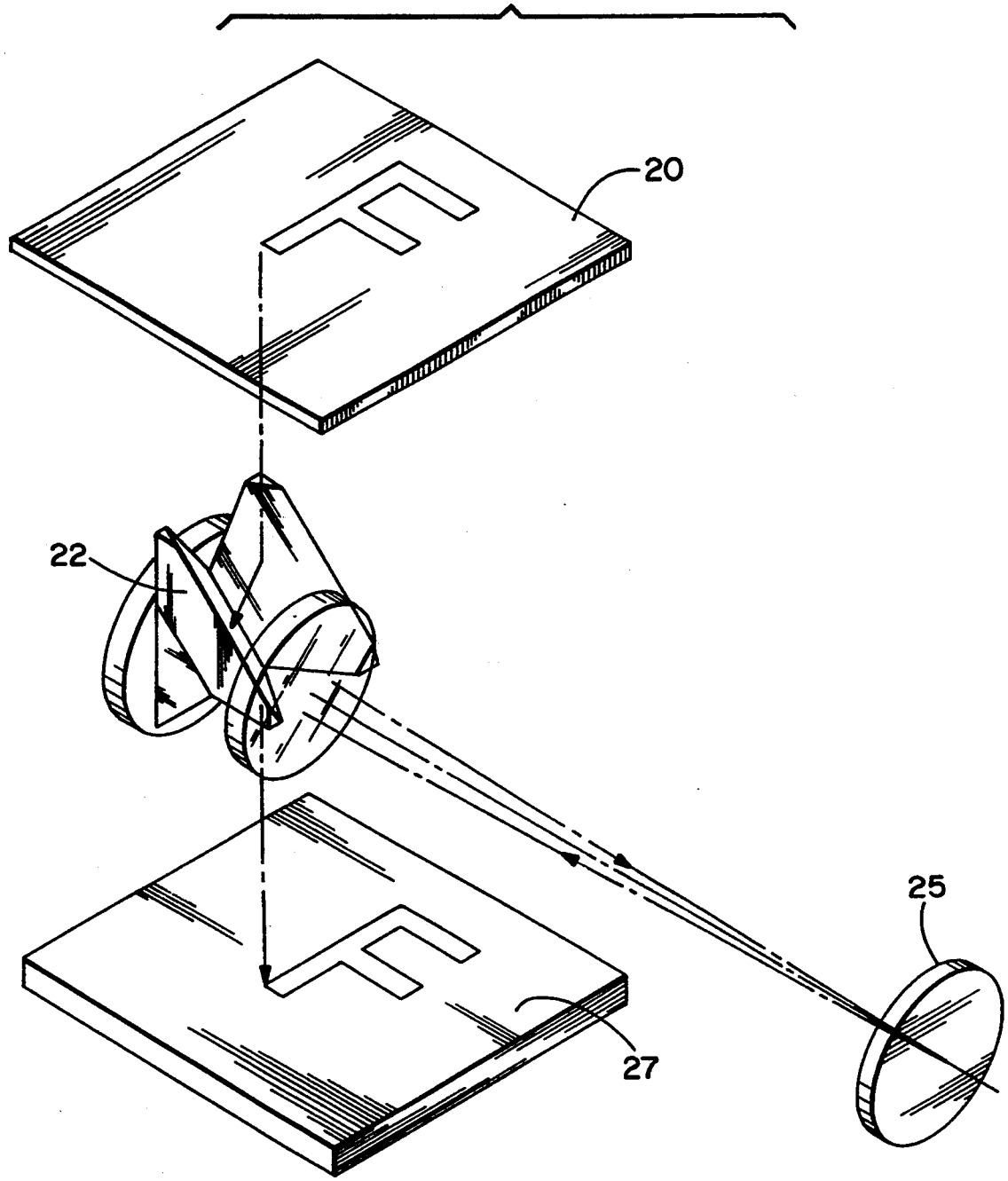
FIG. 3 is an illustration of the beam folding optical elements used in the prior art apparatus of FIG. 1.

Referring to FIG. 1, a scanning apparatus of the prior art is shown wherein a laser beam 10 (from, for example, an excimer laser) is directed off mirrors 12 and 14 and is passed through a shaping and homogenizing stage 16, the beam 10 is then reflected off mirror 18, passes through the patterned mask 20, and is reflected off a 45 degree mirror element 22 through lens 24 and onto concave mirror 25. The laser beam is then reflected from concave mirror 25, off a second 45 degree surface of mirror element 23 and onto the target 27. The lens system illustrated in FIG. 1 is known in the art as a Dyson lens. The Dyson lens is described in the publication "Unit Magnification Optical System Without Seidel Aberrations" by J. Dyson in the Journal of the Optical Society of America, No. 49, p.713, 1959. The scanning laser ablation apparatus of FIG. 1 is further described in the IBM Technical Disclosure Bulletin, Vol. 34, No. 7A, December 1991 at pages 232 and 233. In FIG. 2, the optical path for the Dyson type transfer lens is shown. The laser foci within the lens falls on a mirror coated with dielectric films. The required folding is accomplished by a plano reflecting mirror at one conjugate and a reflecting roof at the other conjugate as shown in FIG. 3.

The roof of the transfer lens is not straddled by the image forming beam, so the tolerances of the roof are not critical and also laser damage in this region is avoided. However, the technique of parity correction by the introduction of the roof degrades the diffraction limited resolution of the transfer lens in the direction perpendicular to the roof due to polarization. In the prior art apparatus of FIG. 1 this problem is avoided by using only a quarter of the total circular field of the transfer lens, however in order to fully utilize the power available from the laser and to improve the throughput of the tool, it is desirable to have an increased field size.

Figure 4:
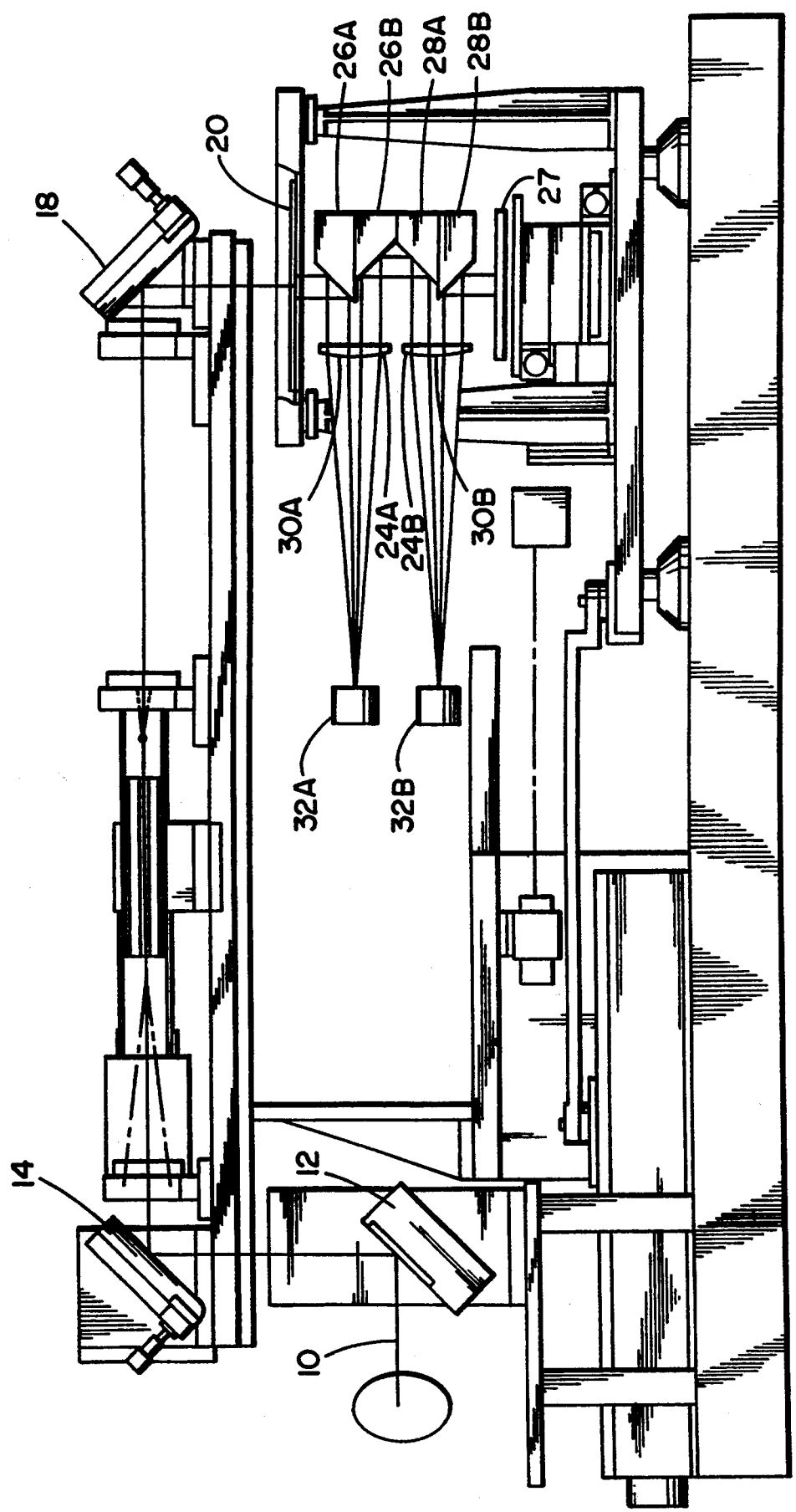
FIG. 4 is a schematic illustration of a side-view of an apparatus for scanning a laser beam onto an object for ablation which includes a parity corrected double lens structure according to the principles of the present invention.

Referring to FIG. 4, a scanning ablation tool according to the present invention is illustrated that incorporates two transfer lenses in tandem that results in the use of essentially the full field of the transfer lenses without the need of a roof for parity correction and without the need for custom coatings because the degrading effect of a reflecting roof is absent.

In FIG. 4, the optical elements, laser 10, mirrors 12, 14, 18, homogenizing stage 16 mask 20 and target 27 are the same as described relative to the apparatus of FIG. 1. The transfer lens of FIG. 1 with its reflecting roof 22 is replaced in the structure FIG. 4 by two transfer lenses in tandem and includes a double Dyson lens system. Because it is a double lens structure, the Dyson lens system is automatically parity corrected. The transfer lenses of FIG. 4 includes a first mirror element incorporating two 45 degree mirrors 26A and 26B and a second mirror element including two 45 degree mirrors 28A and 28B. The tandem transfer lens further includes correction lenses 30A and 30B and concave mirrors 32A and 32B.

The laser beam passes through projection mask 20 and is reflected from mirror 26A through correction lens 30A and onto concave mirror 32A. The laser beam is then reflected from concave mirror 32A back through correction lens 30A and onto mirrors 26B and 28A which reflect the beam through correction lens 30B and onto concave mirror 32B.

The laser beam is then reflected from concave mirror 32B back through correction lens 30B and onto 45 degree mirror 28B wherein it is reflected onto target 27.

Although the mirrors 26A and 26B and 28A and 28B were functionally described as being incorporated in two mirror elements, it will be understood that the mirror facets 26A, 26B, 28A and 28B can be formed in a single mirror unit. In FIG. 4 the mirrors are shown optically contacted or glued together into one unit.

Figure 5:
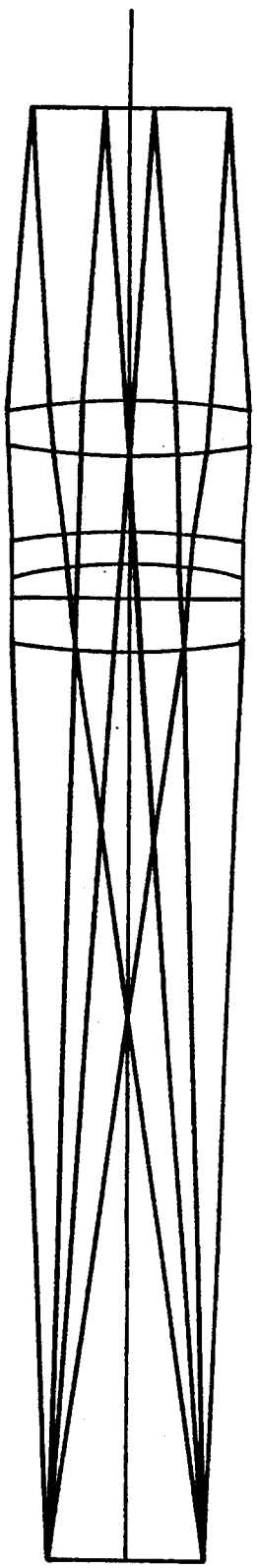
FIG. 5 is a schematic illustration showing the embodiment using several lens elements and their associated optical paths for the apparatus of the present invention shown in FIG. 4.

Also in FIG. 4, the correction lenses 30A and 30B were illustrated schematically as a single component (30A and 30B). It may be possible that the use of two transfer lenses as employed in FIG. 4 increases the spherical aberration. Even though, for ablation applications the performance is acceptable, the spherical aberrations may be avoided by using a multi-lens component as shown in FIG. 5 selected for eliminating the spherical aberration. The present invention also provides the advantage that the use of a double Dyson transfer lens results in a shorter, more compact optical path. The distance between mirrors 22 and 25 in the prior art structure of FIG. 1 is made longer than the distance between mirrors 26A,B and 28A,B and mirrors 32A,B in the embodiment of the invention in FIG. 4. While the invention has been particularly shown and described with respect to a preferred embodiment thereof, it will be understood by those skilled in the art that changes in form and details may be made therein without departing from the scope and spirit of the invention.

We claim:

1. In a laser scanning apparatus of the type including a laser beam source and an optical system including a projection mask wherein said laser beam is directed through said projection mask onto a target, the improvement comprising:

a projection mark means in the path of a laser beam, a target means, a double lens system disposed in the path of said laser beam between said projection mask means and said target means, said double lens system including a multiple mirror element consisting of a first lens having first and second angularly disposed mirrors and a second lens having third and fourth angularly disposed mirrors, first and second correction lenses, first and second concave mirrors, and wherein first and second mirrors of said multiple mirror element, said first correction lens and said first concave mirror form a first optical lens system path for reflecting said laser beam from said projection mask back and forth between said first and second mirrors of said multiple mirror element and said first concave mirror through said first correction lens, and wherein said third and fourth mirrors of said multiple mirror element, said second correction lens and said second concave mirror form a second optical lens system path for reflecting said laser beam back and forth between said third and fourth mirrors of said second concave mirror through said second correction lens and onto said target.

2. The laser scanning apparatus of the type according to claim 1 wherein said multiple mirror element includes first, second, third and fourth angularly disposed reflecting surfaces, said first reflecting surface of said multiple mirror element being angularly disposed in the path of said laser beam directed through said projection mask for reflecting said laser beam in a first direction, said first correction lens and said first concave mirror being disposed in the path of said laser beam reflected from said first reflecting surface wherein said laser beam passes through said first correction lens, and reflects from said first concave mirror in a second direction opposite to said first direction back through said first correction lens onto said second angularly disposed reflecting surface of said multiple mirror element for reflection therefrom, wherein said third reflecting surface of said multiple mirror element is angularly disposed in the path of said laser beam reflected from said second reflecting surface of said multiple mirror element for reflecting said laser beam in said first direction, said second correction lens and said second concave mirror being disposed in the path of said laser beam reflected from said third reflecting surface wherein said laser beam passes through said second correction lens and reflects from said second concave mirror in said direction back through said second correction lens and onto said fourth angularly disposed reflecting surface of said multiple mirror element for reflection therefrom, and wherein said laser beam is reflected from said fourth reflecting surface onto said target.

3. A laser scanning apparatus of the type according to claim 2 wherein said target is disposed in the path of said laser beam that passes through said projection mask and said double lens system is disposed between said projection mask and target in the path of said laser beam, and wherein said first reflecting surface is disposed at substantially a 45 degree angle with respect to said laser beam from said projection mask to reflect said laser beam at a substantially 90 degree angle through said first correction lens, and wherein said second reflecting surface is disposed at substantially a 45 degree angle with respect to said laser beam reflected from said first concave mirror back through said first correction lens to reflect said laser beam at a substantially 90 degree angle towards said third reflecting surface.

4. A laser scanning apparatus of the type according to claim 3 wherein said third reflecting surface is disposed at a substantially 45 degree angle with respect to said laser beam from said second reflecting surface to reflect said laser beam at a substantially 90 degree angle through said second correction lens, and wherein said fourth reflecting surface is disposed at substantially a 45 degree angle with respect to said laser beam reflected from said second concave mirror back through said second correction lens to reflect said laser beam at a substantially 90 degree angle towards said target.

5. A laser scanning apparatus according to claim 4 wherein said laser beam is scanned over said projection mask, to form an image of said mask, and wherein said double lens system projects said image of said mask onto said target.

* * * * *